(12) United States Patent
Koseoglu et al.

(10) Patent No.: US 11,214,745 B1
(45) Date of Patent: Jan. 4, 2022

(54) FUEL OIL COMPOSITION CONTAINING DISSOLVED POLYMER WASTE

(71) Applicant: SAUDI ARABIAN OIL COMPANY, Dhahran (SA)

(72) Inventors: Omer Refa Koseoglu, Dhahran (SA); Robert Peter Hodgkins, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/922,932

(22) Filed: Jul. 7, 2020

(51) Int. Cl.
*C10L 1/16* (2006.01)
*C08J 11/06* (2006.01)

(52) U.S. Cl.
CPC ............... *C10L 1/165* (2013.01); *C08J 11/06* (2013.01); *C10L 1/1608* (2013.01); *C08J 2325/06* (2013.01); *C10L 2200/0438* (2013.01); *C10L 2290/24* (2013.01)

(58) Field of Classification Search
CPC .................. C10L 1/165; C10L 1/1608; C10L 2200/0438; C10L 2290/24; C07C 15/00; C07C 15/42; C07C 15/50; C07C 5/00; C07C 4/12; C07C 4/14; C07C 7/04; C08J 11/06; C08J 2325/06
See application file for complete search history.

(56) References Cited

U.S. PATENT DOCUMENTS 10,968,396 B1 * 4/2021 Koseoglu ................ C10B 55/00
2018/0230070 A1    8/2018 Beadle et al.
2018/0374327 A1 * 12/2018 Enekwa ............. G06Q 20/3672

FOREIGN PATENT DOCUMENTS

JP          10-88155 A        4/1988

OTHER PUBLICATIONS

Hydro de arylation of Heavy Alkyl Bridged No condensed Alkyl Aromatics to Recover High Value Mono Aromatics Hodgkins, Koseoglu, Adam Ind Eng Chem Res 2019 58, 19042-19049 (Year: 2019).*
International Search Report and Written Opinion dated Oct. 6, 2021 in counterpart International application PCT/US2021/039926.

* cited by examiner

*Primary Examiner* — Pamela H Weiss
(74) *Attorney, Agent, or Firm* — Leason Ellis LLP

(57) ABSTRACT

A low value aromatic fuel blending composition containing dissolved waste polystyrene materials having a caloric value comparable to the heavy aromatic compounds in which it is dissolved is disclosed, along with a process for its production from a mixture of heavy aromatic hydrocarbons recovered as the bottoms/reject streams from a variety of refinery aromatics recovery units.

18 Claims, 5 Drawing Sheets

FUEL OIL COMPOSITION CONTAINING DISSOLVED POLYMER WASTE

FIELD OF INVENTION

This disclosure relates to a process for preparing a fuel oil blending component containing dissolved polymeric material, and specifically, waste polystyrene.

BACKGROUND OF THE INVENTION

Polystyrene is a synthetic long-chain aromatic hydrocarbon polymer made from the monomer styrene which has the form of a phenyl group attached to an ethylene moiety in which the double bond breaks during the polymerization reaction to form the chain in which the phenyl group is attached to every other carbon center.

Polystyrene is a thermoplastic polymer that is a solid at room temperature, but flows-if heated above about 100° C.; it becomes rigid again when cooled. Discarded polystyrene is not subject to environmental biodegradation and is resistant to photo-oxidation. It is projected that it will resist biodegradation for hundreds of years. Expanded polystyrene foam is easily broken into smaller pieces and into particles comprising one or more foam cells. These pieces and particles can be carried by the wind and due to its low specific gravity it floats on water. As a result, this waste material has been accumulating as a form of litter in the outside environment, particularly along shores and waterways, and in the Pacific Ocean, especially in its foamed form. It can have serious effects on the health of birds or marine animals that swallow significant quantities of the foam particles or beads which readily become dissociated when larger foamed shapes are broken.

When polystyrene is properly incinerated at high temperatures, e.g., up to 1000° C., and with an excess of air, the chemicals generated are water, carbon dioxide, and possibly small amounts of residual halogen-compounds from flame-retardants introduced at the time of manufacture. If incineration is incomplete, carbon soot is produced and a complex mixture of volatile compounds is formed in the combustion gas. For example, when polystyrene was burned at 800°-900° C., which is the typical temperature range of a modern incinerator, the products of combustion consisted of "a complex mixture of polycyclic aromatic hydrocarbons (PAHs) from alkyl benzenes to benzoperylene". The American National Bureau of Standards Center for Fire Research has identified 57 chemical by-products released during the combustion of expanded polystyrene foam. For these and other reasons, incineration of foamed polystyrene waste is generally not considered to be an environmentally acceptable means of disposal.

The problem addressed by the present disclosure is that of economically disposing of waste and discarded foamed polystyrene material in a process that recovers its heat values while minimizing the production of toxic combustion products.

Aromatics as Fuel Blending Components

It is known in the art from JP 10088/55 (1996) to dissolve up to 50 W % of expanded polystyrene foam in one or more petroleum fractions, preferably having an aromatic content of 20% or more in order to enhance the solubility of the polystyrene. A suitable solvent is light cycle oil (LCO) boiling in the range of 165° C. to 450° C., and preferably having a low sulfur content, e.g., 0.1 W % or less. The hydrocarbon solvents described as suitable in this reference would also include other components such as paraffins and naphthenes. It is to be noted, as will be discussed below, that these compounds have a lower Hildebrand solubility parameter than aromatics.

A refinery aromatics complex employs a number of process unit operations to convert naphtha or pyrolysis gasoline into benzene, toluene and mixed xylenes, commonly referred to as "BTX", that are basic petrochemical intermediates in the production of numerous other chemical products. In order to maximize the production of benzene, toluene and mixed xylenes, the feed to an aromatics complex is generally limited to C6 and up to C10 compounds. In most aromatics complexes, the mixed xylenes are further processed in the complex to form the isomer para-xylene for downstream processing to produce terephthalic acid. Terephthalic acid is a valuable chemical intermediate that is used in the production of polyesters, such as polyethylene terephthalate.

In order to increase the production of benzene and para-xylene, the toluene and C9 and C10 aromatics are processed in the complex employing a toluene, C9, C10 transalkylation/toluene disproportionation (TA/TDP) process unit operation to produce benzene and mixed xylenes. Any remaining toluene, C9 and C10 aromatics are recycled to extinction. Compounds heavier than C10 are generally not processed in the TA/TDP unit because they can cause rapid deactivation of the catalysts at the relatively higher operating temperatures that are typically greater than 400° C.

When para-xylene is recovered from the mixed xylenes by a selective adsorption process unit in the complex, the C8 feed to the selective adsorption unit is processed to eliminate olefins and alkenyl aromatics such as styrene that can be present in the feed. Any olefinic materials present can react and occlude the pores of the zeolite adsorbent. Olefinic materials can be removed by passing a C8+ stream across a clay or acidic catalyst to react olefins and alkenyl aromatics with another compound, which is typically an aromatic molecule, thereby forming heavier compounds, e.g., C16+. These heavier compounds are readily separated from the mixed xylenes by fractionation. These heavier compounds likewise cannot be processed in the TA/TDP unit due to their tendency to deactivate the catalyst, and they are generally removed from the complex as blending components for lower value fuels.

During the hydrocarbon processing, aromatic compounds may be formed in which one or more coupled alkyl groups containing three or more carbon molecules are joined in the ring. These compounds may be formed in the processes used by petroleum refiners and petrochemical producers to produce aromatic compounds from a non-aromatic hydrocarbon feed, such as by catalytic reforming. Many of these heavy alkyl aromatic compounds fractionate with the fractions containing greater than 10 carbon atoms and they are not typically sent as feedstock to the transalkylation unit, but are instead sent for gasoline blending or for use as fuel oil.

As used herein, the terms multi-aromatic and polyaromatic compounds are used to describe di-aromatic, tri-aromatic and tetra-aromatic compounds.

In a process to recover light alkyl mono-aromatic compounds from heavy alkyl aromatic compounds and alkyl-bridged non-condensed alkyl aromatic compounds, the alkyl bridge of the non-condensed alkyl-bridged multi-aromatics or heavy aromatic compounds are cleaved in the presence of hydrogen and a catalyst to form mono-aromatic compounds. This process has been termed "hydrodearylation". See ASC Ind. Eng. Chem Res., Hodgkins et al. (2019). As used in this disclosure, hydrodearylation means a conversion process for breaking the bonds of the alkyl bridge of non-condensed alkyl-bridged multi-aromatics or heavy alkyl aromatic compounds in the presence of a catalyst and hydrogen to form alkyl mono-aromatic compounds.

A hydrodearylation process is described in U.S. Pat. No. 10,053,401 issued Aug. 21, 2018 in which the feedstream to the hydrodearylation unit can be C9+ alkyl aromatic compounds derived from a xylene rerun column. The desired products recovered from the hydrodearylation unit are light mono-aromatic compounds.

The feedstream as described in the '401 patent can be a combined stream of recycled unconverted heavy alkyl-bridged non-condensed alkyl multi-aromatic compounds. In order to avoid a build-up of the heavy aromatic hydrocarbons in the reaction stream, following recovery of the desired product stream of light mono-aromatic compounds from the final splitter column downstream of the hydrodearylation unit, a portion of the heavy aromatic bottoms is removed from the system as a bleed stream. The remainder of the heavy aromatic hydrocarbons are recycled to extinction as a portion of the combined feed to the hydrodearylation reactor unit.

A process is also known to fractionate the reject/bottoms stream of a xylene re-run column, which is the same reject/bottoms stream that is used as the feed to the hydrodearylation unit described above, and to upgrade the heavy fractions of fuel oil components to provide a petrochemical feedstock. The economic benefit realized by converting a reject/bottoms stream from an aromatics recovery complex by upgrading a significant proportion of the low value fuel oil blending component into a petrochemical feedstock is apparent. The C9+ stream from a xylene re-run column is fractionated to remove C9 and C10, leaving a C11+ stream, which is deemed to be a low-value fuel oil blending component. The separated C9 and C10, and toluene streams are directed to a toluene, C9, C10 transalkylation/toluene disproportionation (TA/TDP) unit to be processed to produce increased quantities of C8 that can be further processed downstream to yield para-xylene.

The C11+ fuel oil stream is subjected to hydrodearylation as above, and the hydrodearylated liquid products are further fractionated to separate the C8, C9 and C10 compounds. The unconverted C11+ stream consists principally of condensed di-aromatics that can be recovered for use as low value fuel oil blending components and comprises approximately 25% of the original low value fuel oil stream. The C8, C9 and C10 upgraded light ends which account for approximately 75% of the original fuel oil stream, are directed to the TA/TDP processing unit that is directly upstream of the stripper column that is part of this complex. The C8, C9 and C10 upgraded light ends are not directed to further upstream processing where the isomerization takes place in the TA/TDP process unit in order to avoid converting the C8 fraction into its isomerization products and then having to re-form the C8 compounds in another downstream process. Instead, the C8 fraction is separated from the C9 and C10 fractions. The remaining C9 and C10 fractions are recycled to the upstream section of the TA/TDP process unit, and in the presence of toluene, undergo isomerization reactions to extinction to form benzene and para-xylene.

Vacuum residue is a highly viscous hydrocarbon stream that can be employed as a fuel oil; however, this vacuum residue typically requires blending with other hydrocarbon streams referred to as cutter stocks to reduce its viscosity and to meet other specifications for use as a fuel oil. Common cutter stocks for fuel oil blending are kerosene, light cycle oil and light gas oil. These cutter stocks are significantly more valuable than the resulting fuel oil blend, so this loss of value translates into a significant cost of meeting the viscosity specification of the fuel oil. It would, therefore, be desirable to minimize the amount of cutter stock in the finished fuel oil blend, while still meeting the specification for the fuel oil.

In addition to meeting the fuel oil specifications, the fuel oil blending components must be compatible with each other in order to produce a stable blended fuel oil. Therefore, the solubility of the fuel oil blending components is very important in the selection of the cutter stocks. It is desirable that a hydrocarbon blending component have a high solubility parameter. For example, if the cutter stock is paraffinic, the blended residual oil may not be stable and fouling is foreseeable. For this reason, a cutter stock with a relatively high solubility parameter is preferred. It has been found that the aromatic bottoms, or reject stream from the aromatic recovery complex possess a high solubility parameter as compared to refinery straight run petroleum fractions.

The Hildebrand solubility parameter is one of the oldest and most widely accepted systems used in industry to rate hydrocarbon solvents. (See Joel H. Hildebrand, Journal of Paint Technology, Vol. 39, No. 505, February 1967.) The Hildebrand solubility parameter is based on the cohesive energy density of the solvent, which in turn is derived from the heat of vaporization. The basic theory behind the Hildebrand solubility parameter derives from the observation that when a liquid is heated, energy is added to the liquid resulting in an increase in the temperature of the liquid. However, once the liquid reaches its boiling point, the further addition of heat does not cause a further increase in temperature. The energy that is added is used entirely to separate the molecules of the liquid and convert them to the gaseous state. If the amount of energy is measured, e.g., in calories, that was added from the onset of boiling to the point when all of the liquid has boiled away, a direct measure is obtained of the amount of energy in calories that is required to convert the liquid to the vapor state. This value is also a measure of the amount of the van der Waals forces that held the molecules of the liquid together.

The amount of heat energy that is required to separate the molecules and vaporize the liquid is called the heat of vaporization. From the heat of vaporization, as measured in calories per cubic centimeter of liquid, the cohesive energy density "δ" is derived from the following expression:

$$\delta = \frac{\Delta H - R*T}{Vm} \quad (1)$$

where:
δ=cohesive energy density
ΔH=heat of vaporization
R=gas constant
T=temperature
Vm=molar volume Hildebrand posited the solubility parameter as the square root of the cohesive energy density as a numerical value that is indicative of the solvency behavior of a specific solvent.

$$\delta = \left[\frac{\Delta H - R*T}{Vm}\right]^{1/2} \quad (2)$$

where:
δ=cal$^{1/2}$
δ=MPa$^{1/2}$ or SI

The calculated values of the Hildebrand solubility parameters for kerosene, light gas oil and aromatic bottoms streams are shown in Table 1, along with the typical values for other individual hydrocarbon compounds.

TABLE 1

| Solvent | δ = MPa$^{1/2}$ |
|---|---|
| Heptane | 15.3 |
| n-Dodecane | 16.0 |
| Benzene | 18.7 |
| Kerosene | 16.3 |
| Light gas oil | 15.7 |
| Aromatic Bottoms (full range) | 20.7 |
| Aromatic Bottoms 180° C.+ | 21.2 |

As shown in Table 1, heptane, a paraffinic solvent with a carbon number of 7 has a Hildebrand solubility parameter (HSP) of 15.3 and n-dodecane, a paraffinic solvent with a carbon number of 12 has an HSP value of 16. Benzene, a mono-aromatic solvent with a carbon number of 6 has an HSP value of 18.7. Kerosene's HSP is 16.3 which is consistent with the presence of its paraffinic and aromatic components. Light gas oil appears to be more paraffinic in nature based on its somewhat lower HSP as compared to the kerosene fraction. The aromatics bottoms stream, whether it is a full range stream received directly from an aromatic recovery complex, or the distilled fraction boiling above 180° C., exhibits relatively higher HSP values in the range 20.7-21.2. Based on these relatively high HSP values, it can be concluded that the aromatic bottoms reject stream obtained from an aromatic recovery complex is an effective solvent, and has good blending properties that are consistent with a stable fuel oil blending component.

SUMMARY OF THE INVENTION

Based on the above determinations, the present disclosure is directed to the processing of waste polymeric materials that to date have presented apparently intractable environmental disposal problems, and in particular, of waste expanded polystyrene foam material in an economical and environmentally acceptable manner. The present disclosure is also directed to low value aromatic fuel blending composition containing dissolved polystyrene that has a caloric value comparable to that of the original aromatic composition. The process provides a practical means of disposing of waste polymeric materials that is efficient and cost effective by forming a polymer-containing mixture of heavy aromatic compounds that is suitable for use as a fuel oil blending component without adversely affecting the heating value or the stability of the finished fuel oil.

In the process and fuel oil blending composition of the present disclosure, the solvent composition is fully aromatic, that is, it consists essentially entirely of aromatic compounds and is comprised of di-aromatic, tri- and tetra-aromatic compounds. This is an important characteristic since the Hildebrand solubility parameter of the C11+ aromatics is greater than for even mono-aromatic benzene. This combination of C11+ aromatics constitutes an advantageous solvent for polystyrene and particularly for foamed polystyrene particles. It has been found that the solution can be used as a low value cutter stock for heavy fuel oils, and specifically marine fuels.

Example 1—Heavy Aromatics Bottoms Stream Properties

An aromatics bottoms fraction weighing 8.2473 kg was distilled using a lab scale true boiling point distillation column with 15 or more theoretical plates in accordance with ASTM method D2917 and was used as the solvent in the following examples. The fraction boiling in the range IBP to 240° C. corresponded to 27.5 wt. % of the feed and the 240+° C. fraction constituted the remaining 72.5 wt. %.

The properties and composition of the as-received aromatic bottoms stream and fractionated streams, and of a hydrodearylated stream are shown in Table 2. The hydrocarbon speciation of the as-received feed was determined by two-dimensional gas chromatography commonly referred to as "GCXGC".

TABLE 2

| | Feedstock Properties | | | |
|---|---|---|---|---|
| Property | Feedstock Aromatics Bottoms | IBP-240° C. Fraction | 240+° C. Fraction | Hydro-dearylated (350° C., 15 bar, 1.6 LHSV) |
| Density | 0.9812 | 0.9485 | 0.9947 | 0.9318 |
| IBP | 198 | 198 | 210 | 83 |
| 10W% | 211 | 206 | 253 | 115 |
| 30W% | 236 | 212 | 275 | 171 |
| 50W% | 274 | 216 | 294 | 224 |
| 70W% | 302 | 231 | 314 | 256 |
| 90W% | 329 | 237 | 339 | 329 |
| FBP | 400 | 258 | 444 | 449 |
| Paraffins (wt. %) | 0.1 | — | — | 0.5 |
| Mono-Naphthenes (wt. %) | 0.3 | — | — | 0.3 |
| Di-naphthenes (wt. %) | 0.3 | — | — | 0.1 |
| Mono-aromatics (wt. %) | 13.3 | — | — | 38.9 |
| Naphtheno Mono-aromatics (wt. %) | 12.6 | — | — | 14.2 |
| Di-aromatics (wt. %) | 62.6 | — | — | 34.0 |
| Naphtheno Di-aromatics (wt.%) | 6.5 | — | — | 4.7 |
| Tri/tetra-aromatics (wt.%) | 4.3 | — | — | 7.2 |

Example 2 - Characteristic of FPS Solution

Waste foamed polystyrene (FPS) was dissolved in the aromatic-rich stream of Example 1. The FPS sample had a Mw=233,600 g/mol as determined by gel permeation chromatography. Thermogravimetric analysis of the aromatic stream containing the dissolved FPS provided the following heat loss profile:

At 230° C., 99.7% mass was retained.

At 344° C., the FPS exhibits its on-set temperature.

At 393° C., the FPS exhibited its maximum decomposition temperature.

At 600° C., the FPS had lost 95.6% of its mass.

At 900° C., the FPS had lost 96.0% of its mass.

Example 3—Foamed Polystyrene/Aromatic Blend Properties

Waste expanded polystyrene foam (5 g) was dissolved in a C11+ aromatic-rich stream (50 g) by stirring at room temperature. The properties are given in table 3.

TABLE 3

FPS/aromatic-rich stream blend properties

| Property | Feedstock Aromatics Bottoms |
|---|---|
| Density (ASTM D-4052) (g/cc) | 0.9907 |
| Sulfur, ppmw | <50 |
| Microcarbon Residue (ASTM D-4530) (wt. %) | 0.23 |
| Viscosity at 40 ° C., (ASTM D7042) (cSt) | 91.253 |
| Viscosity at 50 ° C., (ASTM D7042) (cSt) | 71.825 |
| Viscosity at 100 ° C., (ASTM D7042) (cSt) | 10.88 |
| IBP (ASTM D-7169) (° C.) | 192 |
| 10W% (° C.) | 206 |
| 30W% (° C.) | 242 |
| 50W% (° C.) | 272 |
| 70W% (° C.) | 297 |
| 90W% (° C.) | 324 |
| FBP (° C.) | 476 |
| Gross heat value (ASTM D-4809) (Btu/lb) | 18,031 |

The gross heat value of the aromatic-rich stream prior to blending with FPS was determined by ASTM D-4809 having a value of 17,996 Btu/lb.

BRIEF DESCRIPTION OF THE DRAWINGS

The invention will be described in further detail below with reference to the attached drawings in which the same or similar elements are referred to by the same number, and where.

DETAILED DESCRIPTION OF PREFERRED EMBODIMENTS

Sources of Aromatics Bottoms/Reject Stream

Processes are described from which the aromatics bottoms/reject stream for use in the process of the invention are derived.

Figure 1:
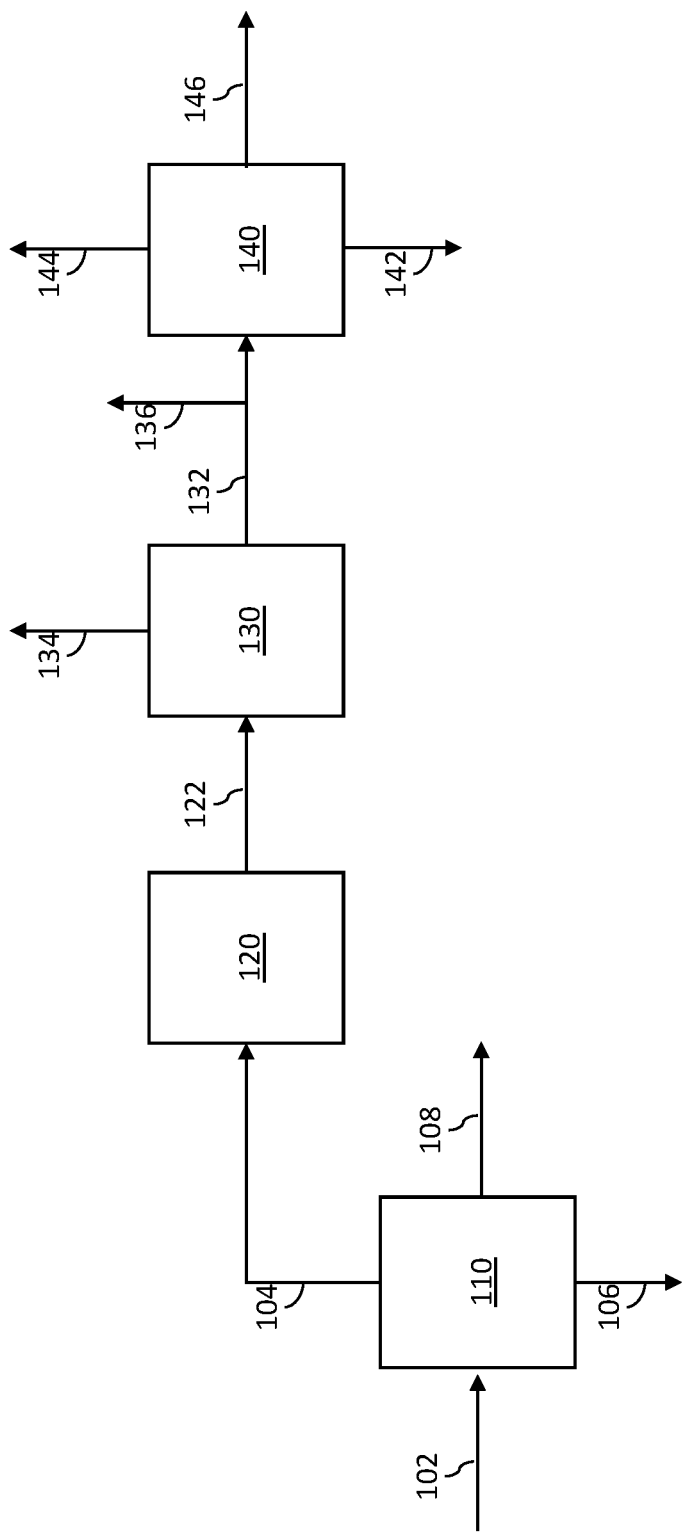
FIG. 1 is a simplified schematic illustration of conventional refinery unit operations of the prior art for the production of gasoline and the recovery of aromatics.

In accordance with the prior art system shown in the schematic diagram of FIG. 1, a crude oil feed stock (102) is passed to an atmospheric distillation unit (ADU) (110) to recover a naphtha stream (104) boiling in the range from about 36° C. to about 180° C., and diesel stream (108) boiling in the range from about 180° C. to 370° C. The atmospheric residue (AR) stream (106) boils at about 370° C. and above. Naphtha stream (104) is hydrotreated in a naphtha hydrotreating (NHT) unit (120) to reduce the sulfur and nitrogen content to less than about 0.5 ppmw, and the hydrotreated naphtha stream (122) is sent to a naphtha reformer (NREF) (130) to improve its quality by increasing its octane number to provide a gasoline blending stream or a feedstock for an aromatics recovery unit, and that produces hydrogen stream (134). Diesel stream (108) is hydrotreated in a diesel hydrotreating (DHT) unit (not shown) to desulfurize the diesel oil and produce a diesel fraction meeting stringent specifications, e.g., less than 10 ppmw sulfur. The atmospheric residue (AR) fraction (106) is used either as a fuel oil blending component or, alternatively, is sent for further separation, or to conversion units to convert low value hydrocarbons to higher value products. The reformate stream (132) from NREF (130) can be recovered for use as a gasoline blending component (136), or alternatively is sent to an aromatics recovery complex (ARC) (140) to recover separate product streams of higher value aromatics (146), including benzene, toluene and xylenes, commonly referred to as BTX.

The properties and composition of the as-received aromatic bottoms or reject stream and the fractionated streams, and a hydrodearylated stream from the aromatics recovery complex were as set out in Table 2.

Figure 2:
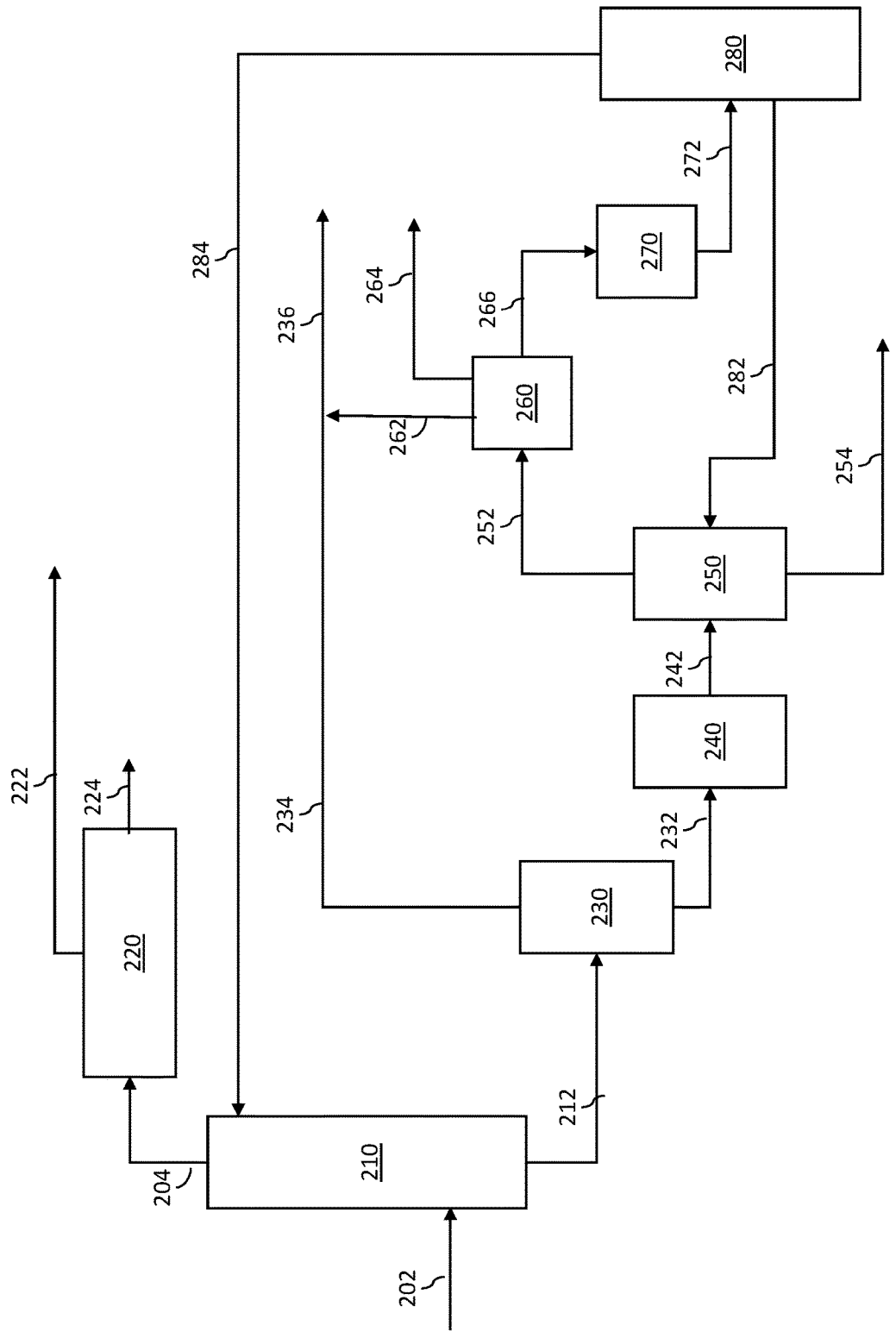
FIG. 2 is a simplified schematic illustration of an aromatic production complex of the prior art.

Referring now to the simplified schematic diagram of FIG. 2, there is shown an aromatics recovery complex of the prior art, for example, the ARC (140) of FIG. 1. Reformate stream (202) from a catalytic reforming unit, such as, for example, the naphtha reformer (130) of FIG. 1, is split into two fractions: a light reformate stream (204) containing C5-C6 hydrocarbons, and a heavy reformate stream (212) containing C7+ hydrocarbons. A reformate splitter (210) separates reformate stream (202) and the light reformate stream (204) is sent to a benzene extraction unit (220) to recover a benzene product stream (224), and a raffinate of substantially benzene-free motor gasoline (mogas) stream (222). The heavy reformate stream (212) from the reformate splitter is sent to a second splitter (230) which produces a C7 cut mogas stream (234) and a C8+ hydrocarbon stream (232).

With continuing reference to FIG. 2, the C8+ hydrocarbon stream (232) is sent to a clay treater (240) and the C8+ product stream (242) is fed to a xylene rerun unit (250) to separate the C8+ hydrocarbons into C8 hydrocarbon stream (252) and C9+, i.e., a heavy aromatic mogas hydrocarbon stream (254). The C8 hydrocarbon stream (252) is passed to a p-xylene extraction unit (260) to recover p-xylene product stream (264). P-xylene extraction unit (260) also produces a C7 cut mogas stream (262), which is combined with C7 cut mogas stream (234) to produce C7 cut mogas stream (236). Other xylenes (266) are recovered and sent to xylene isomerization unit (270) for conversion to p-xylene. The isomerized xylenes (272) are sent to xylene fractionation column (280). The converted fraction is recycled to the p-xylene extraction unit (260) from column (280) as separate streams (282) and (284), respectively. Splitter top stream (284) is recycled to reformate splitter (210). The heavy fraction from the xylene rerun unit (250) is recovered as process reject or aromatic bottoms that is shown as C9+ and heavy aromatic mogas in FIG. 2 stream (254), or stream (142) in FIG. 1.

Figure 3:
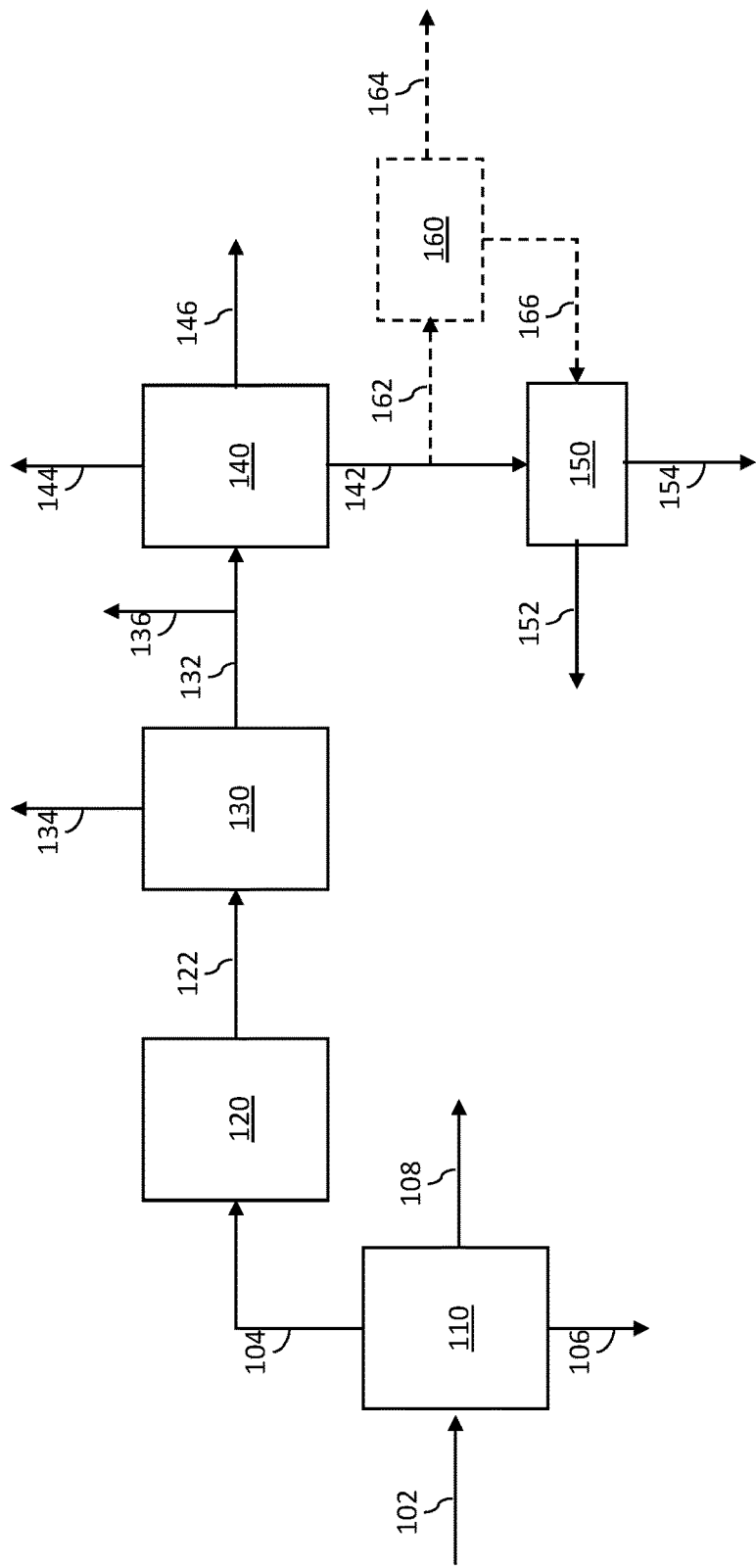
FIG. 3 schematically illustrates the hydrodearylation of an aromatics bottoms stream of the prior art.

Referring now to the simplified schematic diagram of the prior art process of FIG. 3, the aromatics bottoms fraction (142) from the aromatics recovery complex (ARC) (140) of FIG. 1 is either: (a) directed to a separate atmospheric distillation unit (ADU) (160) via a side stream (162), with the 36° C. to 180° C. fraction (164) being sent directly for use as a gasoline blending component, or the C9 and C10 hydrocarbons (164) are removed and directed to a transalkylation unit for use as petrochemical feedstock, and the 180+° C., or C11+ fraction (166) is sent to a hydrodearylation unit (150); or (b) it is directed as a separate stream (142) to the hydrodearylation unit (150) to recover light alkyl mono-aromatic compounds (154) from the heavy alkyl aromatic and alkyl-bridged non-condensed alkyl aromatic compounds.

Figure 4:
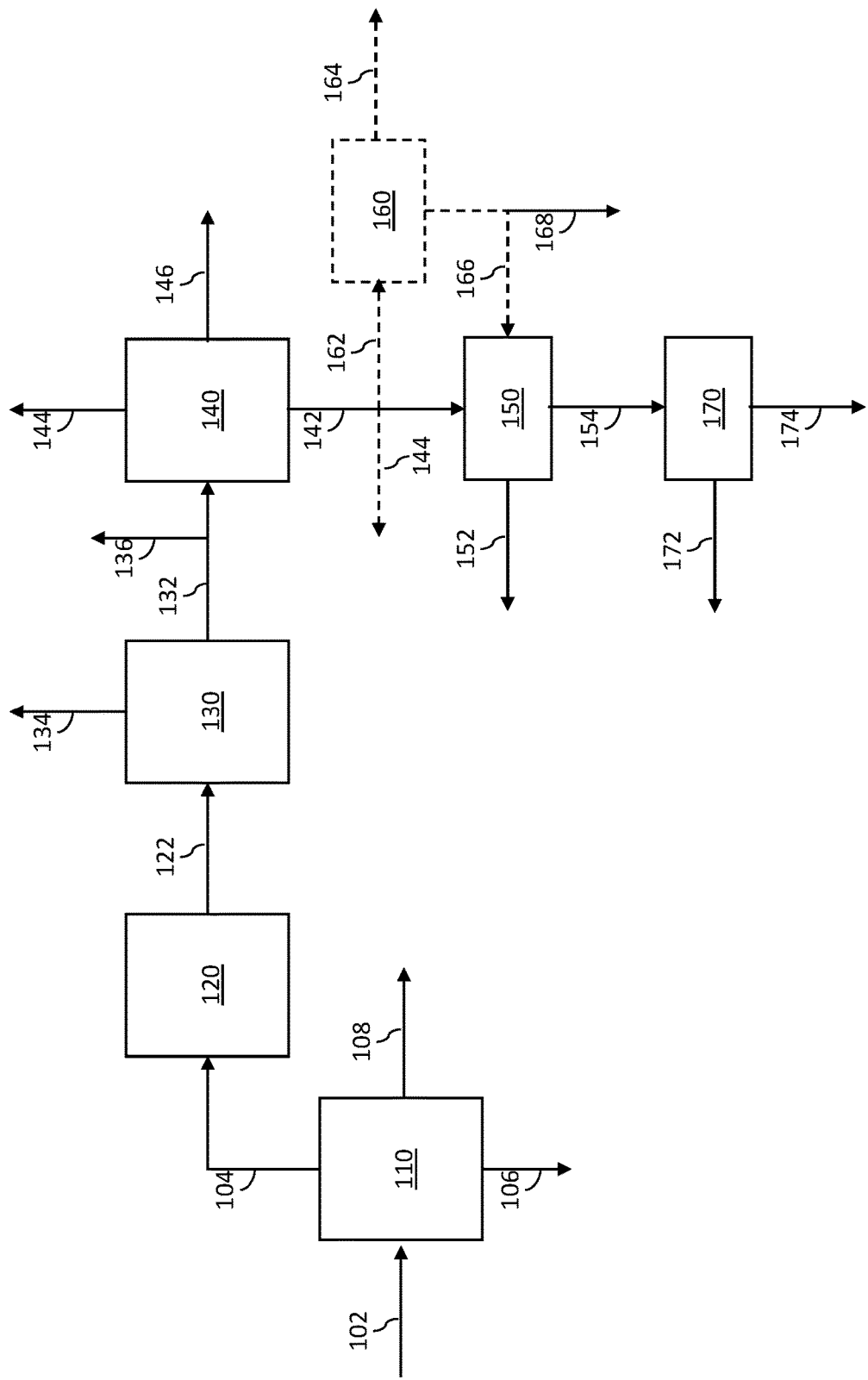
FIG. 4 schematically illustrates the heavy aromatics fractionation for gasoline/petrochemical and fuel oil blending components of the prior art.

Referring to FIG. 4, there is schematically illustrated an alternative process of the prior art in which the aromatics bottoms stream (142) is directed as fuel oil component (144) to the fuel oil blending pool. Alternatively, the aromatics bottoms stream (142) is sent to a hydrodearylation unit (150) and the hydrodearylated bottoms stream (154) which is passed to a second atmospheric distillation unit (ADU) (170) for the separation and recovery of light alkyl mono-aromatic compounds (172) from the heavy alkyl aromatic and alkyl-bridged non-condensed alkyl aromatic compounds; and the heavy alkyl aromatic and alkyl-bridged non-condensed alkyl aromatic compounds and any unconverted condensed di-aromatic compounds are recovered (174) for use as a fuel oil blending component. The stream (172) can be processed downstream as a gasoline blending component or as a feedstock for petrochemicals production. The aromatic bottoms or reject stream (142) can be fractionated in an atmospheric distillation unit (160) via the ADU stream (162), where the fraction (164) boiling at 180° C. and below recovered for use as a gasoline blending component, or alternatively, the C9 and C10 components are sent to a transalkylation unit, and the fraction boiling at 180° C. and above, which is the C11+ fraction, is sent directly to the fuel oil blending pool as fuel oil component (168); or, optionally, sent via a separate stream (166) to hydrodearylation unit (150) and the hydrodearylated bottoms stream (154) is passed to an atmospheric distillation unit (170) to recover light alkyl mono-aromatic compounds (172) from the heavy alkyl aromatic and the alkyl-bridged non-condensed alkyl aromatic compounds, with any unconverted heavy alkyl aromatic and alkyl-bridged non-condensed alkyl aromatic compounds (174) being sent directly to the fuel oil blending pool as a blending component.

Preparation of Multi-Aromatic Solution with Dissolved Styrene

Figure 5:
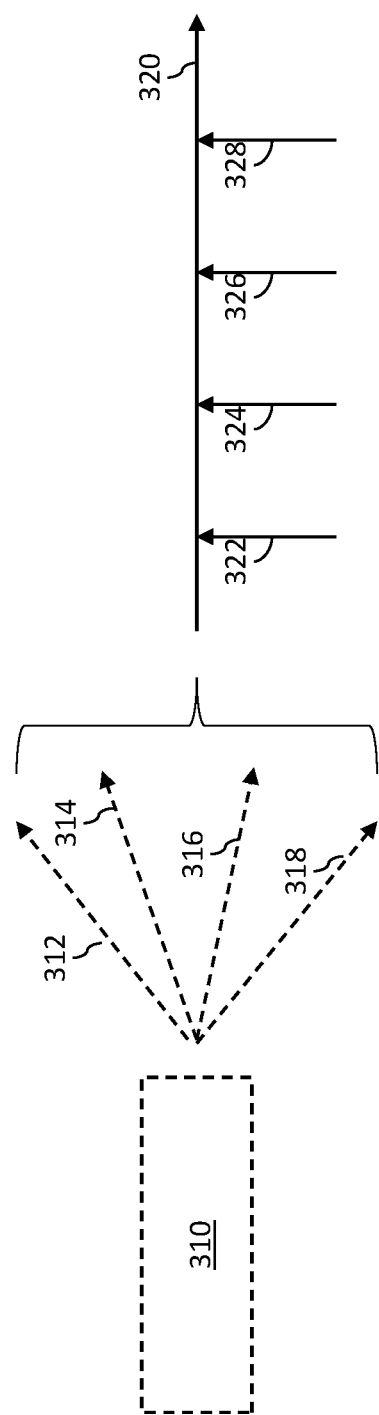
FIG. 5 schematically illustrates the process of the present disclosure for the production of a waste polymer-containing heavy aromatics stream for use as a fuel oil blending component.

The process of the present disclosure will be described with continuing reference to the simplified schematic diagram of FIG. 5. Accumulated waste polystyrene material, which can be in the form of foamed polystyrene or solid polystyrene, or a combination of both is comminuted, e.g., by grinding, chopping, shredding, milling, cutting or other form of processing using methods and apparatus known in the art to reduce the waste material to predetermined smaller sized pieces or particles. The purpose of comminuting the polystyrene material is to facilitate dissolving the solid material in the aromatic solvent efficiently and economically, i.e., with the least expenditure of energy possible considering the type and scale of the apparatus that is available for this purpose in the refinery or other processor's facility.

Energy will be expended in the operation of the apparatus employed to reduce the size of the original material to a predetermined size range that has been found to optimally facilitate the formation of a solution with the aromatic component in which the polystyrene is completely dissolved. The foamed polystyrene is readily soluble in the heavy aromatics and the smaller particles will dissolve more rapidly, thereby reducing the mixing time and energy required.

Since the preferably saturated solution of the dissolved polystyrene in the aromatic compounds is to be used as a blending component for a relatively low value fuel oil composition, the aromatic blending component must be able to pass through the combustion nozzles or jets that introduce the liquid fuel oil into the combustion chamber of the boiler, furnace or other device without blocking or otherwise interfering with the uniform flow of the fuel oil.

In an embodiment of the process of this disclosure, the mixture of the solid waste polystyrene of reduced size is stirred or otherwise agitated in the aromatic solvent in an appropriate mixing vessel for a period of time that has been predetermined experimentally to dissolve all, or substantially all of solid polystyrene that was originally present in the mixing vessel. The aromatic component containing the dissolved polystyrene is then decanted or otherwise passed through a screen or other form of filter material prior to, or simultaneously with its discharge from the mixing vessel. The mesh size of the filter is selected to assure that the aromatic component and any undissolved small particles of polystyrene will meet the specification for the final fuel oil blend.

The ability to completely and efficiently dissolve a predetermined quantity of polystyrene particles to preferably saturate a given volume of aromatic solvent is dependent upon the temperature of the solvent in a given mixing apparatus. If the aromatics bottoms/reject stream from the aromatics recovery complex is at a relatively high temperature, it will be able to dissolve a greater amount of polystyrene waste than a room temperature stream. The operating temperature in the mixing vessel can be from 20° C. to 300° C., and preferably from 80° to 250° C.

Consideration must also be given to the lowest temperatures that will be experienced by the aromatic solution downstream of the mixing vessel. If the aromatic solvent is saturated at the higher temperature, a significant reduction in temperature will promote the formation of agglomerated polystyrene and/or its precipitation from the solution.

Foamed polystyrene is preferably ground (312), shredded (314), pulverized (316), or otherwise comminuted (318), and the smaller particles are mixed with one or a combination of the heavy aromatics bottoms compounds (142, 154, 168, 174254) recovered as described above for a time that is sufficient to dissolve all or substantially all of the foamed polystyrene particles to saturate the solution. The aromatic stream containing dissolved styrene is recovered with appropriate filtering as described above and passed for use as a fuel oil blending component. The fuel oil (320) comprises the heavy aromatic bottoms with dissolved foamed polystyrene, kerosene (322), LGO (324), FCC DCO (326) and vacuum residue (328). The heating value of the fuel oil is not adversely impacted by the addition of the aromatic bottoms stream containing the dissolved polystyrene.

While systems and methods have been described above and with reference to the accompanying drawings for the preparation of the fuel oil blending component containing dissolved polystyrene in accordance with the present disclosure, various modifications will be apparent from this description and the scope of protection accorded the invention is to be determined by the claims that follow.

We claim:

1. A fuel oil blending component consisting of a mixture of dissolved waste polystyrene material and di-aromatic, tri-aromatic and tetra-aromatic compounds derived from a refinery aromatics recovery unit operation.

2. The blending component of claim 1 in which the aromatic compounds are recovered as the bottoms or reject stream from an aromatic recovery complex.

3. The blending component of claim 1 which is substantially free of sulfur.

4. The blending component of claim 1 in which the di-aromatic compounds comprise a major proportion of the mixture of aromatic compounds.

5. The blending component of claim 1 in which tri-aromatic and tetra-aromatic compounds constitute a minor proportion of the mixture of aromatic compounds.

6. The blending component of claim 1 in which the aromatic compounds, without dissolved styrene, have an initial boiling point of 150° C.

7. The blending component of claim 1 in which the mixture of aromatic compounds contains C11+ aromatic compounds.

8. The blending component of claim 1 in which the aromatic compounds are recovered from the heavy bottoms recycle stream of a hydrodearylation unit operation following recovery of the C6+ mono-aromatic compounds.

9. The blending component of claim 8 in which the mixture of aromatic compounds contains a fraction having an initial boiling point of 180° C.

10. The blending component of claim 1 in which the waste polystyrene was originally in the form of solid polystyrene material.

11. The blending component of claim 10 which is formed by the dissolution of comminuted polystyrene material.

12. The fuel oil blending component of claim 1 in which the mixture of contains up to 20 wt. % of dissolved polystyrene.

13. A heavy marine fuel comprised of the fuel oil blending component of claim 1.

14. The blending component of claim 8 in which the aromatic compounds are recovered as a bleed stream.

15. The blending component of claim 8 in which the aromatic compounds contain a C11+ fraction.

16. The blending component of claim 1 in which the waste polystyrene was originally in the form of foamed polystyrene material.

17. The fuel oil blending component of claim 1 in which the mixture of aromatic compounds is saturated with dissolved polystyrene at 20° C.

18. The blending component of claim 1 which contains less than 5 ppmw of nitrogen.

\* \* \* \* \*